United States Patent
Garibay et al.

(10) Patent No.: US 10,102,074 B2
(45) Date of Patent: Oct. 16, 2018

(54) SWITCHING ALLOCATION OF COMPUTER BUS LANES

(71) Applicant: International Business Machines Corporation, Armonk, NY (US)

(72) Inventors: Victor A. Garibay, Leander, TX (US); Daniel E. Hurlimann, Austin, TX (US); Chetan Mehta, Austin, TX (US); Fernando Pizzano, Poughkeepsie, NY (US); Thomas R. Sand, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 14/955,766

(22) Filed: Dec. 1, 2015

(65) Prior Publication Data
US 2017/0153949 A1    Jun. 1, 2017

(51) Int. Cl.
| G06F 13/40 | (2006.01) |
| --- | --- |
| G06F 11/14 | (2006.01) |
| G06F 11/30 | (2006.01) |
| G06F 11/22 | (2006.01) |
| G06F 13/16 | (2006.01) |
| G06F 13/38 | (2006.01) |

(52) U.S. Cl.
CPC ........ *G06F 11/1423* (2013.01); *G06F 11/221* (2013.01); *G06F 11/2221* (2013.01); *G06F 11/3027* (2013.01); *G06F 13/1678* (2013.01); *G06F 13/385* (2013.01); *G06F 13/4022* (2013.01)

(58) Field of Classification Search
CPC ............. G06F 13/4081; G06F 11/2033; G06F 11/2005; G06F 11/07
USPC .......................................................... 710/307
See application file for complete search history.

(56) References Cited

U.S. PATENT DOCUMENTS

| 6,658,018 | B1 | 12/2003 | Tran et al. |
| --- | --- | --- | --- |
| 6,760,859 | B1 | 7/2004 | Kim et al. |
| 7,237,139 | B2 | 6/2007 | Hamilton, II et al. |
| 7,293,125 | B2 | 11/2007 | McAfee et al. |
| 7,447,825 | B2 | 11/2008 | Chen |

(Continued)

FOREIGN PATENT DOCUMENTS

| WO | 2008128990 | 10/2008 |
| --- | --- | --- |
| WO | 2009027189 | 3/2009 |

OTHER PUBLICATIONS

Anonymous, Programmable PCI-Express Root Port Bifurcation, IP.com No. 000236239 IP.com Electronic Publication, Apr. 14, 2014.

*Primary Examiner* — Chun Kuan Lee
(74) *Attorney, Agent, or Firm* — Lieberman & Brandsdorfer, LLC

(57) ABSTRACT

The embodiments relate to dynamically allocating lanes of a computer bus. A computer system is configured with a plurality of connectors in communication with a module, with each connector configured to receive a respective adapter. The module detects a presence of each primary and backup adapter present, and controls an initial allocation of lanes to each detected primary adapter for maximizing adapter functionality. After the initial allocation and in response to detecting a failure of at least one primary adapter, the module dynamically switches lanes from the failed adapter to at least one of the one or more remaining primary adapters and the backup adapter.

17 Claims, 6 Drawing Sheets

(56) References Cited

U.S. PATENT DOCUMENTS

| | | |
|---|---|---|
| 7,480,757 B2 | 1/2009 | Atherton et al. |
| 7,539,809 B2 | 5/2009 | Juenger |
| 7,600,112 B2 | 10/2009 | Khatri et al. |
| 7,657,688 B2 | 2/2010 | Atherton et al. |
| 7,660,925 B2 | 2/2010 | Larson et al. |
| 7,668,923 B2 | 2/2010 | Herring et al. |
| 7,711,886 B2 * | 5/2010 | Foster, Sr. .......... G06F 13/409 710/307 |
| 7,721,150 B2 | 5/2010 | Belyakov et al. |
| 7,793,030 B2 | 9/2010 | Jenkins et al. |
| 7,996,591 B2 | 8/2011 | Xie et al. |
| 8,195,589 B2 | 6/2012 | Bakke et al. |
| 9,043,526 B2 | 5/2015 | Freking et al. |
| 2005/0240932 A1 * | 10/2005 | Billau .................. G06F 9/5072 718/104 |
| 2006/0168377 A1 | 7/2006 | Vasudevan et al. |
| 2006/0179195 A1 * | 8/2006 | Sharma ................ G06F 9/5077 710/123 |
| 2007/0233930 A1 | 10/2007 | Gallagher et al. |
| 2008/0027564 A1 * | 1/2008 | Duron ................ G06F 11/2005 700/1 |
| 2010/0106881 A1 * | 4/2010 | Daniel ................ G06F 13/4081 710/313 |
| 2011/0302357 A1 | 12/2011 | Sullivan |
| 2012/0144230 A1 | 6/2012 | Buckland et al. |
| 2014/0223064 A1 | 8/2014 | Wang |
| 2015/0026677 A1 | 1/2015 | Stevens et al. |

\* cited by examiner

|  | Adapter Installed | Lanes Allocated |
|---|---|---|
| 602 Connector$_0$ | Adapter$_0$ | 16 |
| 604 Connector$_1$ | Adapter$_1$ | 16 |
| 606 Connector$_2$ | Adapter$_2$ | 8 |
| 608 Connector$_3$ | Backup Adapter (inactive) | 0 |

FIG. 6

|  | Adapter Installed | Lanes Initially Allocated | Lanes Allocated After Failure |  |
|---|---|---|---|---|
| 702 Connector$_0$ | Adapter$_0$ | 16 | 16 | 722 |
| 704 Connector$_1$ | Adapter$_1$ | 16 | 0 (inactive) | 724 |
| 706 Connector$_2$ | Adapter$_2$ | 8 | 8 | 726 |
| 708 Connector$_3$ | Backup Adapter (inactive) | 0 | 16 | 730 |

FIG. 7

SWITCHING ALLOCATION OF COMPUTER BUS LANES

BACKGROUND

The embodiments described herein relate generally to allocation of lanes to a computer bus. More specifically, the embodiments described herein relate to adapter redundancy and associated lane allocation.

In computer architecture, a bus is a communication system that transfers data between components of a computer system. A local input/output (I/O) bus transfers data between a peripheral component and a computing device. Various types of I/O buses include, but are not limited to, Peripheral Components Interconnect (PCI), Accelerated Graphics Port (AGP), Industry Standard Architecture (ISA), Universal Serial Bus (USB), Micro Channel Architecture (MCA), Enhanced ISA (EISA), Video Electronics Standards Association (VESA), etc.

A PCI Express (PCI-e) bus is an implementation of a PCI computer bus according to a set of PCI Express specifications promulgated by the PCI Special Interest Group. The PCI-e bus uses conventional PCI programming and software concepts, but is based on serial bus architecture as opposed to the parallel bus architecture of the conventional PCI. This physical-layer of the PCI-e computer bus consists of a network of serial interconnections extending from a PCI host bridge or a switch to each peripheral component, referred to herein as an adapter. A connection between the host bridge or the switch to an adapter is referred to as a "link." The link consists of a collection of one or more lanes used for data communications. Each lane is a set of two unidirectional low voltage differential signaling pairs of transmission pathways such as, for example, traces along a motherboard. Since transmitting data and receiving data are implemented using separate differential pairs, each lane allows for full-duplex serial data communication.

Adapters minimally support single-lane links, and may optionally support wider links composed of two (x2), four (x4), eight (x8), twelve (x12), sixteen (x16), or thirty-two lanes (x32) by providing additional pins on the hardware interface of the adapter that plugs into a PCI-e connector, hereinafter referred to as a connector. The connector may physically support connections for one (x1), two (x2), four (x4), eight (x8), twelve (x12), sixteen (x16), or thirty-two (x32) lanes. Each adapter may be received by any connector that physically supports the same or a greater number of lanes as the lanes physically supported by the adapter. For example an adapter (x8) may be installed into any connector (x8)-(x32). Although the connector and its installed adapter may physically support links with up to thirty-two lanes, an adapter may utilize fewer lanes for data communication than the maximum number of lanes physically supported by the adapter and the connector. For example, for an adapter (x8) installed in a connector (x16), the adapter (x8) may utilize one, two, or four of those eight lanes for data communications. The number of lanes actually utilized for the data communications link between the PCI host bridge or switch and an adapter is typically the highest number of lanes mutually supported by the host bridge, the adapter and its corresponding connector.

SUMMARY

The aspects described herein include a system, a method, and a computer program product for dynamically allocating lanes among connectors of a computer bus.

According to one aspect, a system is provided to support dynamic allocation of lanes of a computer bus interface. The system includes a processor in communication with memory and a module. A plurality of connectors is in communication with the module, with each connector configured to receive a respective adapter. The module detects presence of each adapter present at boot-time, including adapters classified as active and adapters classified as backup. The module dynamically controls lane allocation to the connectors having a detected active adapter. At such time as one of the active adapters is detected as subject to a failure, the module functions to transparently maintain the lane allocation by dynamically switching the lanes from the failed adapter to at least one of the remaining adapters and/or the backup adapter.

According to another aspect, a method is provided for dynamically allocating lanes of a computer bus interface. The method includes configuring a computer system with a plurality of connectors in communication with a module, with each connector configured to receive a respective adapter. The module detects a presence of each primary and backup adapter, and controls an initial allocation of lanes to each detected primary adapter. The initial allocation maximizes adapter functionality. After the initial allocation and in response to detecting a failure of at least one primary adapter, the module dynamically switches lanes from the failed adapter to at least one of the one or more remaining primary adapters and the backup adapter.

According to yet another aspect, a computer program product is provided to dynamically allocate lanes of a computer bus interface. The computer program product includes a computer-readable storage medium having program code embodied therewith. The program code is executable by a processing unit to configure a computer system with a plurality of connectors in communication with a module, with each connector configured to receive a respective adapter. A presence of each present primary and backup adapter is detected, and an initial allocation of lanes to each detected primary adapter is controlled. The initial allocation maximizes adapter functionality. After the initial allocation and in response to detecting a failure of at least one primary adapter, lanes are dynamically switched from the failed adapter to at least one of the one or more remaining primary adapters and the backup adapter.

Other features and advantages of this invention will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not all embodiments, unless otherwise explicitly indicated.

FIG. 6 depicts a chart illustrating an allocation of lanes, in accordance with an exemplary embodiment.

FIG. 7 depicts a chart illustrating an allocation of lanes after a detected adapter failure in accordance with an exemplary embodiment.

DETAILED DESCRIPTION

It will be readily understood that the components of the embodiments described herein, as generally described and illustrated in the Figures herein, may be arranged and designed in a wide variety of different configurations. Thus, the following detailed description of the embodiments of the method, computer program product, and system, as presented in the Figures, is not intended to be limited, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments described herein will be best understood by reference to the drawings, wherein like parts are designated by like numerals throughout. The following description is intended only by way of example, and simply illustrates certain selected embodiments of devices, systems, and processes that are consistent with the claims herein.

Allocation of lanes to connectors having installed, or received, adapters may be fixed at boot-time, or power-up time. That is, whichever configuration is picked at the system start, e.g. boot, will be the configuration that the computer system will have during operation. Other approaches for lane allocation include detecting the presence of each received adapter at boot-time, and allocating lanes based on the detection. It is understood that minimal number to no lanes may be allocated to a connector that does not have an installed adapter, or in one embodiment no lanes may be allocated. Such connectors are referred to herein as empty connectors.

Figure 1:
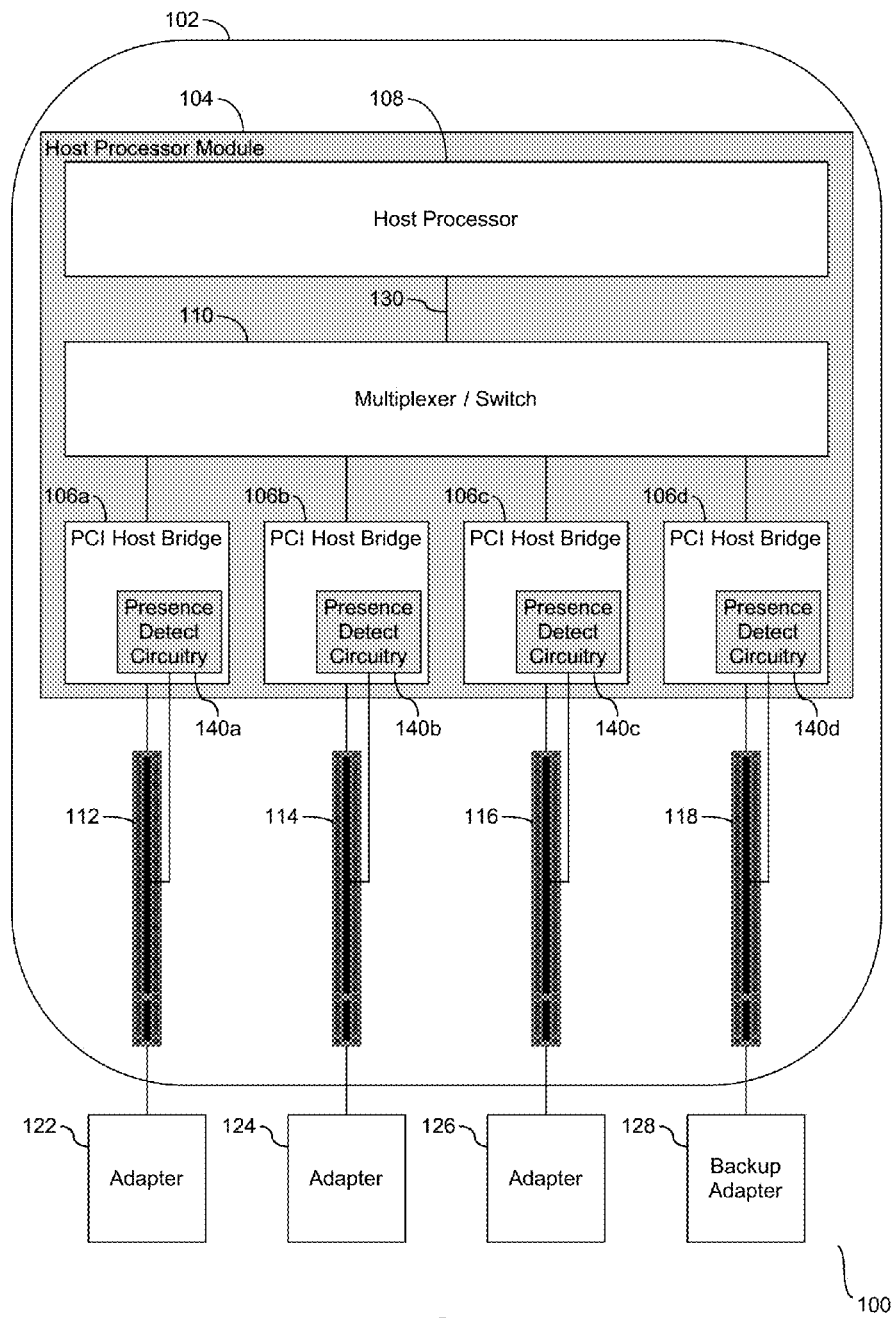
FIG. 1 depicts a block diagram illustrating an example of a computer bus interface system to support adapter redundancy and associated lane allocation.

Server resiliency is a high priority to ensure hosted applications remain functional and operating. One aspect to address continued application operation and processing is to design redundancy into the server. With reference to FIG. 1, a block diagram (100) is provided illustrating an example of a computer bus interface system (102) to support adapter redundancy and associated lane allocation. The system (102) is operational with numerous other general purpose or special purpose computing system environments or configurations. Examples of well-known computing systems, environments, and/or configurations that may be suitable for use with the system (102) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As shown in FIG. 1, the system (102) includes a host processor module (104). The module (104) is further shown having four host bridges (106a), (106b), (106c), and (106d). In alternative embodiments, the quantity of host bridges may be different depending on the computer bus interface system being utilized and, as such, it is to be understood and appreciated that the embodiments described herein are not limited to the four host bridges (106a)-(106d).

The module (104) further includes a host processor (108) in communication with a multiplexer or other switch ("MUX/switch") (110). The MUX/switch (110) is also in communication with each of the host bridges (106a)-(106d). The MUX/switch (110) provides communication between the host processor (108) and each host bridge (106a)-(106d). A plurality of connectors (112)-(118) of the system (102) is shown. Although only four connectors are shown, this quantity is not considered limiting. Each connector (112), (114), (116), and (118) is shown in communication with the module (104) via host bridges (106a), (106b), (106c), and (106d), respectively. In alternative embodiments, the quantity of connectors may be different depending on the computer bus interface system being utilized and, as such, it is to be understood and appreciated that the embodiments described herein are not limited to the four connectors (112)-(118) as shown. As shown, each connector is in communication with a respective host bridge, with a direct correspondence between each host bridge and each associated connector.

It is to be understood that the modular arrangement of the components described herein above is provided as an illustrative example, and it is to be appreciated that the components may be arranged in any configuration in accordance with the embodiments described herein. In other words, the term "module" as used herein should not be interpreted to be limiting with respect to the particular arrangement described above, but should be broadly construed to include any combination of the components. For example, the components may be arranged in a single hardware device, as a combination of multiple hardware devices, or in any combination thereof in accordance with the embodiments described herein.

Each connector (112)-(118) is configured to receive a respective maximum number of lanes for allocation, which may be referred to as a connector width. In one embodiment, each connector (112)-(118) may be a 16 lane PCI-e connector, which means that each connector (112)-(118) has a 16-lane width. Hence, a maximum of sixty-four lanes may (theoretically) be allocated among the connectors shown (i.e., 16×4=64). In the system (102), there are a finite number of total lanes (130) that may be allocated among the connectors (112)-(118). In the embodiment shown and described in FIG. 1, forty total lanes (130) are available for allocation. Accordingly, in this example, there are fewer lanes available for allocation than the maximum number of lanes that may be allocated to each connector, respectively.

Since each of the connectors (112)-(118) has a 16-lane width, any adapter received by the connectors (112)-(118) may not have a lane designation exceeding sixteen lanes, but may have a lane designation less than sixteen lanes. For example, in the embodiment shown and described in FIG. 1, between four and sixteen of the available lanes (130), inclusive, may be allocated among each connector (112)-(118), respectively. In one embodiment, each adapter has a different lane designation and, as such, it is to be understood and appreciated that the adapters may have varying lane designations.

Presence detect circuitry (140a), (140b), (140c), and (140d), hereinafter referred to as detectors (140a)-(140d), are shown embedded in host bridges (106a), (106b), (106c), and (106d), respectively, and in communication with the connectors (112), (114), (116), and (118), respectively. The detectors (140a)-(140d) are configured to detect the adapters present at boot-time, including primary adapters classified to be active and to receive an associated lane allocation, and one or more backup adapters classified to be inactive and to receive a lane allocation after failure of one of the active adapters. Accordingly, the detectors support receipt and classification of both primary and backup adapters.

At boot-time, as shown in this example, adapters (122), (124), and (126) are received by connectors (114), (116), and (118), respectively, and are classified as primary adapters. Similarly, adapter (128) is received by connector (118) and is classified as a backup adapter. More specifically, connector (118) is in receipt of adapter (128) at boot-time, however the classification of the adapter will direct an associated lane allocation. Detectors (140a)-(140c) will detect the presence of primary adapters (122)-(126) received by their respective connectors (112)-(116), while the detector (140d) will detect the presence of backup adapter (128). In response to the detection of a failure of one or more of the primary adapters (122)-(126) received by connectors (112)-(116), respectively, the MUX/switch (110) is configured to control the allocation of at least a portion of the lanes allocated to the failed adapter(s) to the backup adapter (128), and in one embodiment, to increase the lane allocation to any remaining active primary adapters, in accordance with the method described below with reference to FIGS. 2 and 3.

Figure 2:
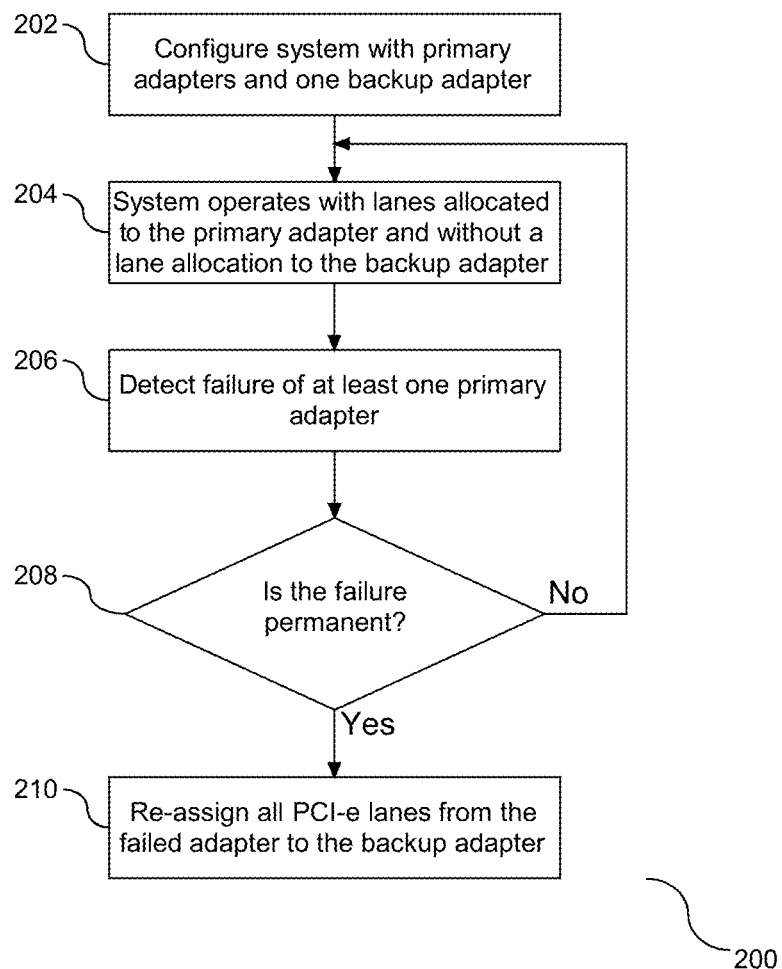
FIG. 2 depicts a flow chart illustrating an example of lane reassignment using a backup adapter.

Referring now to FIG. 2, a flow chart (200) is provided illustrating an example of lane reassignment using a backup adapter. As shown, the system is configured with a set of primary adapters and at least one backup adapter (202), as shown and described in FIG. 1. During operating, the system runs with the lanes allocated to the primary adapter, and without a lane allocation to the backup adapter (204). In one embodiment, the backup adapter is pre-designated with a minimal lane allocation. Similarly, in one embodiment, the backup adapter is defined by an operator prior to an initial program load (IPL). A failure of at least one of the primary adapters is detected (206), and it is then determined if the failure is classified as permanent (208). In one embodiment, a permanent adapter failure requires replacement of the adapter. Similarly, in one embodiment, a non-permanent failure of the adapter is an indication that the adapter may recover from the failure. As such, a negative response to the determination at step (208) is followed by a return to step (204). More specifically, the negative response is not followed with a lane re-allocation. However, a positive response to the determination at step (208) is an indication that the failure is not recoverable, and the adapter requires replacement. In order to transparently maintain system performance, the positive response to the determination at step (208) is followed by re-assignment of all PCIe lanes from the failed adapter to the backup adapter (210). At the same time, the lane allocation to the remaining functional adapters is static, e.g. unaffected. The re-assignment at step (210) includes all of the lanes that had been assigned to the failed adapter with re-assignment to the connector in communication with the designated backup adapter. In one embodiment, the re-allocation at step (210) takes place dynamically and in a transparent manner, thereby maintaining system performance. Accordingly, as shown herein, the backup adapter functions to transparently replace the failed adapter.

Figure 3:
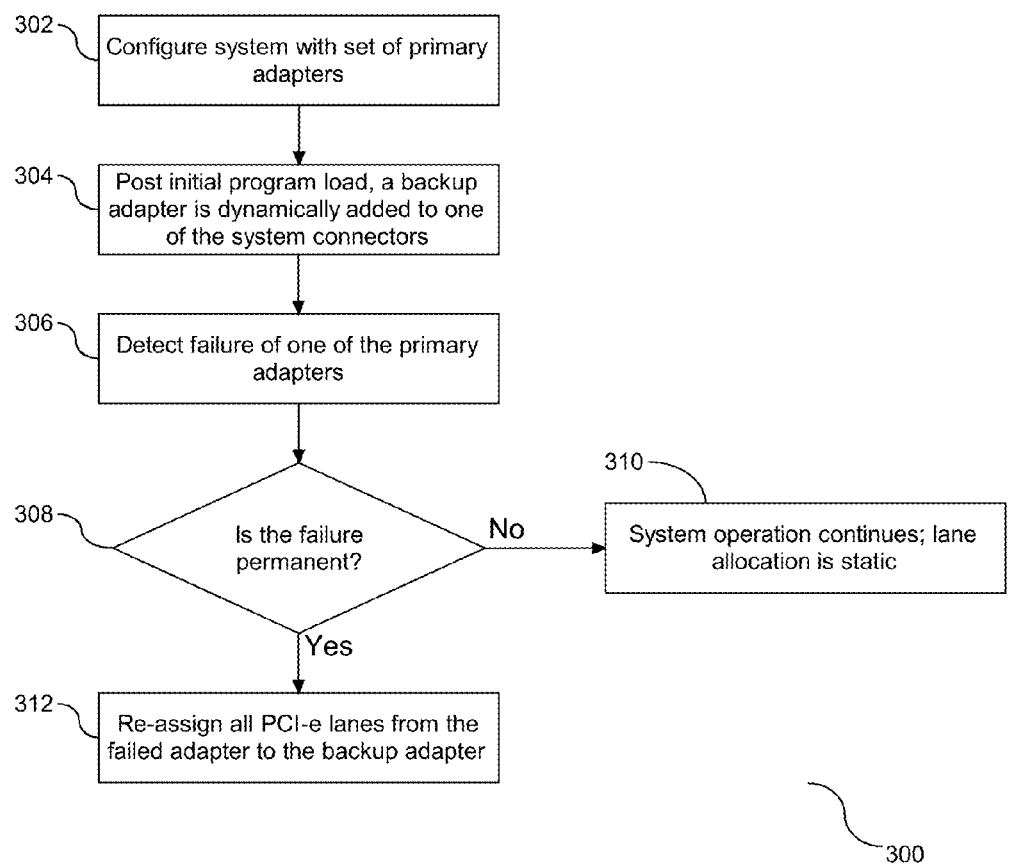
FIG. 3 depicts a flow chart illustrating a process for using a backup adapter post initial program load.

Referring to FIG. 3, a flow chart (300) is provided illustrating a process for using a backup adapter post IPL. As shown, the system is configured with a set of primary adapters, each in communication with an associated connector (302). The configuration at step (302) is limited to primary adapters, and as such, the original system configuration does not include a backup adapter. Post IPL, a connector receives an adapter designated as a backup adapter (304). More specifically, the adapter received at step (304) is dynamically added to the designated connector. System re-boot is not required. Following step (304), a failure of at least one of the primary adapters is detected (306). It is then determined if the failure is classified as permanent (308). In one embodiment, a permanent adapter failure requires replacement of the adapter. Similarly, in one embodiment, a non-permanent failure of the adapter is an indication that the adapter may recover from the failure. As such, a negative response to the determination at step (308) is followed by continued operation of the system, with the lane allocation remaining static (310). In one embodiment, since the failure is not permanent, at such time as the failed adapter returns to an operational state, the lane allocation will be operating at full strength. Accordingly, a non-permanent adapter failure allows the system operation and associated lane configuration to remain static.

However, a positive response to the determination at step (308) is an indication that the failure is not recoverable, and the adapter requires replacement. In order to transparently maintain system performance, the positive response to the determination at step (308) is followed by re-assignment of all PCIe lanes from the failed adapter to the backup adapter (312). At the same time, the lane allocation to the remaining functional adapters is static, e.g. unaffected. The re-assignment at step (312) includes all of the lanes that had been assigned to the failed adapter with re-assignment to the connector in communication with the designated backup adapter. In one embodiment, the re-allocation at step (312) takes place dynamically and in a transparent manner, thereby maintaining system performance. Accordingly, as shown herein, the backup adapter functions to transparently replace the failed adapter.

As shown in FIGS. 2 and 3, the backup adapter may be configured with the system prior to IPL, see FIG. 2, or after IPL, see FIG. 3. In both of these scenarios, the lanes from the failed adapter are dynamically allocated to the backup adapter. The lane allocation, as shown, is shared in that the lanes from the failed adapter are transferred to the backup adapter and is not subject to any re-allocation among the primary adapters and the backup adapter. Accordingly, the use of the backup adapter provides resiliency to the system by employing the backup adapter in a redundant manner.

Figure 4:
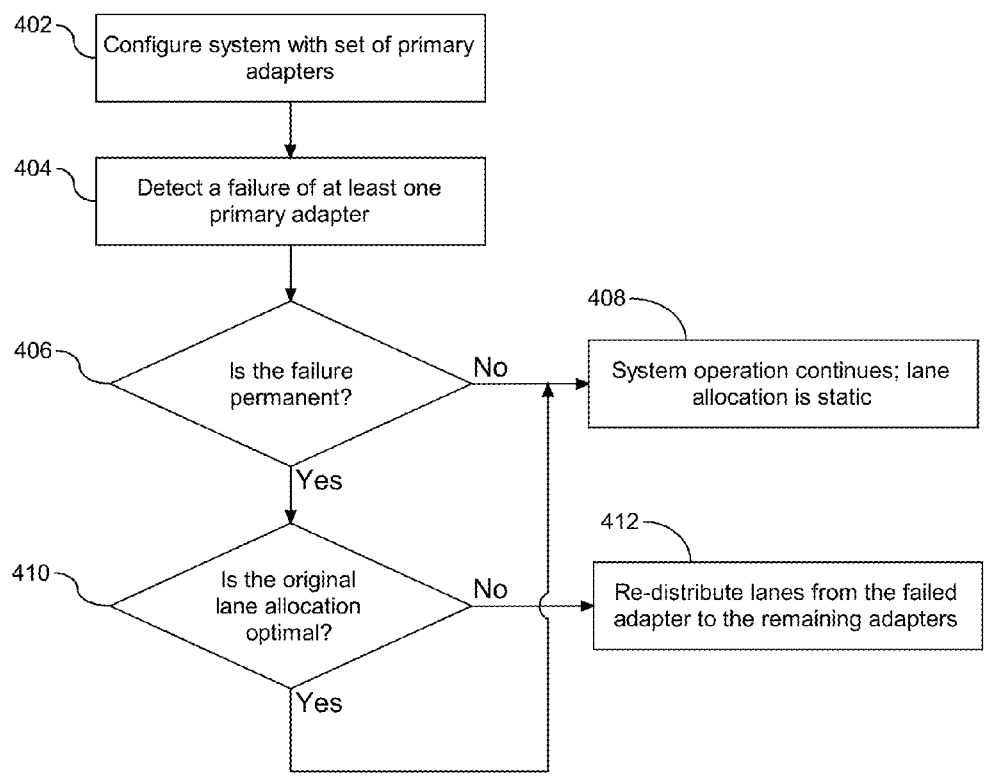
FIG. 4 depicts a flow chart illustrating a process for re-distributing lanes following detection of an adapter failure.

Referring to FIG. 4, a flow chart (400) is provided illustrating a process for re-distributing lanes following detection of an adapter failure. In one embodiment, the original or prior lane assignment may be sub-optimal, and as such, the detection of the adapter failure is an opportunity to re-distribute the lanes in an optimal manner. As shown, the system is configured with a set of primary adapters, each in communication with an associated connector (402). The configuration in step (402) is limited to primary adapters, and as such, the original system configuration does not include a backup adapter. In response to detection of a failure of at least one of the primary adapters (404), it is determined if the failure is classified as permanent (406). In one embodiment, a permanent adapter failure requires replacement of the adapter. Similarly, in one embodiment, a non-permanent failure of the adapter is an indication that the adapter may recover from the failure. As such, a negative response to the determination at step (406) is followed by continued operation of the system, with the lane allocation remaining static (408). In one embodiment, the failure is not permanent, at such time as the failed adapter returns to an operational state, the lane allocation will be operating at full strength. The non-permanent adapter failure allows the system operation and associated lane configuration to remain static. More specifically, the negative response maintains the prior lane allocation with the understanding that the failed adapter will recover, and as such, the lane allocation to the failed adapter remains. Accordingly, in the event of a transient adapter failure, the lane allocation to each of the adapters remains static.

However, a positive response to the determination at step (406) is followed by a second determination to ascertain if the original lane allocation was optimal (410). More specifically, a permanent failure of the adapter, or a failure that require replacement of the adapter is an opportunity to assess the original lane allocation. In one embodiment, one of primary adapters may be running with less than maximum lane allocation, and a re-allocation of lanes to this adapter may enable the adapter to operate with maximum support. A positive response to the determination at step (410) is followed by a return to step (408), as an indication that the original lane allocation is sufficient and shall be maintained. However, a negative response to the determination at step (410) is followed by a re-distribution of lanes from the failed adapter to the remaining primary adapters (412). Similarly, in one embodiment, the failed adapter may be replaced with a backup adapter, as shown in FIGS. 2 and 3, and the re-distribution at step (412) would include the backup adapter in the lane re-distribution. Accordingly, as shown, the event of an adapter failure may be employed as an opportunity to re-distribute lanes among the remaining primary adapters and/or a backup adapter.

Figure 5:
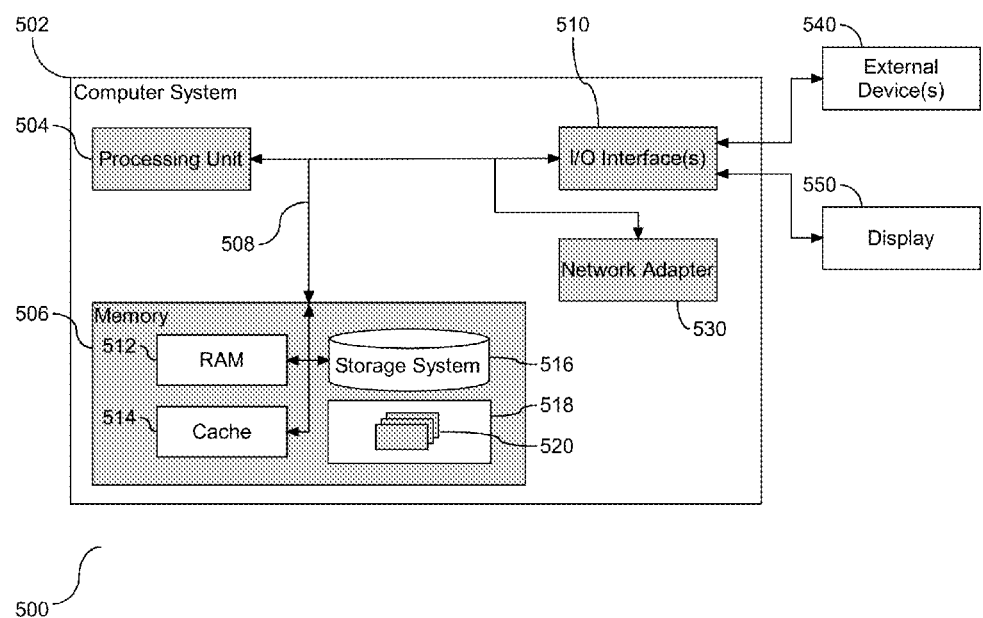
FIG. 5 depicts a block diagram illustrating an example of a computer system to implement the processes shown in FIGS. 2-4.

Referring now to FIG. 5, a block diagram (500) is provided illustrating an example of a computer system (502) for implementation of the processes shown in FIGS. 2-4. Computer system/server (502) may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, computer system/server (502) is shown in the form of a general-purpose computing device. The components of computer system (502) may include, but are not limited to, one or more processors or processing units (504), a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system (502) typically includes a variety of computer system readable media. Such media may be any available media that is accessible by computer system (502), and it includes both volatile and non-volatile media, removable and non-removable media.

Memory (506) can include computer system readable media in the form of volatile memory, such as random access memory (RAM) (512) and/or cache memory (514). The system (502) further includes other removable/non-removable, volatile/non-volatile computer system storage media. By way of example only, storage system (516) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces. As will be further depicted and described below, memory (506) may include at least one program product having a set (e.g., at least one) of program modules that are configured to carry out the functions of the embodiments described above with reference to FIGS. 1-4.

Program/utility (518), having a set (at least one) of program modules (520), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (520) generally carry out the functions and/or methodologies of embodiments as described above with reference to FIGS. 1-4.

The computer system (502) may also communicate with one or more external devices (540), such as a keyboard, a pointing device, a display (550), etc. The external devices (540) may include hardware components that may linked to the processor (504) for transmission and receipt of data via connectors of the I/O interface (510). In one embodiment, I/O interface (510) is a PCI-e computer bus interface. The I/O interface (510) may include a module (not shown) for controlling lane allocation among adapters of the external devices (540) received by the I/O interface (510), as described above with reference to FIGS. 1-4.

The computer system may also communicate with one or more other devices that enable a user to interact with the computer system (502) and/or any devices (e.g., network card, modem, etc.) that enable the computer system (502) to communicate with one or more other computing devices. Still yet, the computer system (302) can communicate with one or more networks such as a local area network (LAN), a general wide area network (WAN), and/or a public network (e.g., the Internet) via network adapter (530). As depicted, network adapter (530) communicates with the other components of the computer system (502) via bus (508). It should be understood that although not shown, other hardware and/or software components could be used in conjunction with the computer system (502). Examples, include, but are not limited to: microcode, device drivers, redundant processing units, external disk drive arrays, RAID systems, tape drives, and data archival storage systems, etc.

Referring now to FIG. 6, a chart (600) is provided illustrating an allocation of lanes in accordance with an exemplary embodiment. As shown, there are four connectors, $Connector_0$ (602), $Connector_1$ (604), $Connector_2$ (606), and $Connector_3$ (608), each having a maximum width of sixteen lanes. In this example, at power-up, also known as boot-up, $Adapter_0$ (612), $Adapter_1$ (614), and $Adapter_2$ (616) are detected to be installed in, or received by, Connectors (602)-(606), respectively. These adapters are referred to herein as primary adapter. A backup adapter (618) is detected in communication with $Connector_3$ (608), which indicates that $Connector_3$ (608) has an inactive adapter. Sixteen lanes are allocated to each of $Adapter_0$ (612) and Adapter$_1$ (614), eight lanes are allocated to Adapter$_2$ (616), and zero lanes are allocated to Connector$_3$ (608) at boot-up. Accordingly, at boot-up, there are forty lanes allocated to Adapters (612)-(616), with a maximum total number of sixty-four lanes that may be supported, as designated by the Connectors (602)-(608).

Referring now to FIG. 7, a chart (700) is provided illustrating an allocation of lanes after a detected adapter failure in accordance with an exemplary embodiment. As shown, there are four connectors, Connector$_0$ (702), Connector$_1$ (704), Connector$_2$ (706), and Connector$_3$ (708), each having a maximum width of 16 lanes. In this example, there are three primary adapters, Adapter$_0$ (712), Adapter$_1$ (714), and Adapter$_2$ (716) received by, Connectors (702)-(706), respectively. A backup adapter (718) is detected in communication with Connector$_3$ (708), which indicates that Connector$_3$ (708) has an inactive adapter. Sixteen lanes are allocated to each of Adapter$_0$ (712) and Adapter$_1$ (714), eight lanes are allocated to Adapter$_2$ (716), and zero lanes are allocated to Connector$_3$ (708) at boot-up. As shown, a failure of the second adapter, Adapter$_1$ (714) is detected. The status of the backup adapter (718) has changed from inactive to active, and the sixteen lanes from Adapter$_1$ (714) are transferred to the backup adapter (718). As shown, after failure there is a lane changeover (728). Sixteen lanes are allocated to each of Adapter$_0$ (722) and the backup adapter (730), eight lanes are allocated to Adapter$_2$ (726), and zero lanes are allocated to Connector$_3$ (724). As shown, failure of the second adapter, Adapter$_1$ (714) changes the status of the adapter and the associated lane allocation. The lanes originally assigned to the second adapter (714) are transferred to the backup adapter (728). Accordingly, the original forty lane allocation remains, but with the backup adapter replacing the failed adapter and the associated lane allocation. In the embodiment shown in FIG. 4, the lanes may be re-allocated to the remaining primary adapters (712) and (716) and the backup adapter (718) after the detected adapter failure. Accordingly, the backup adapter enables the lane allocation and associate re-allocation to be transparent and for optimum system performance.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the forms disclosed. Many modifications and variations will be apparent to those of ordinary skill in the art without departing from the scope and spirit of the embodiments described herein. The embodiments were chosen and described in order to best explain the principles and the practical application, and to enable others of ordinary skill in the art to understand the various embodiments with various modifications as are suited to the particular use contemplated. Accordingly, the implementation of lane allocation to adapters received by connectors of a computer bus shown and described herein provides for an initial allocation of lanes to adapters present at boot-up, and a dynamic allocation of lanes in response to detection of the presence of a backup adapter after boot-up.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

We claim:

1. A system comprising:
a processor in communication with memory;
a module comprising a multiplexer in communication with the processor, and two or more host bridges in communication with the multiplexer; and
a plurality of connectors in communication with respective host bridges, including a first connector in communication with a first host bridge and a second connector in communication with a second host bridge, wherein each host bridge is positioned as an interface between its respective connector and the multiplexer, and wherein each connector is configured to receive a respective adapter including the first connector in receipt of a first primary adapter and the second connector in receipt of a second primary adapter;
the module to detect a presence of two or more adapters present at boot-time, including the first primary adapter and the second primary adapter;
an operating system in communication with the module to classify the detected adapters including designate one of the detected primary adapters as the backup adapter, wherein the designation excludes the backup adapter from an initial lane allocation;
the module to:
dynamically control the initial system lane allocation, by the multiplexer, among the two or more detected adapters, wherein the initial system lane allocation maximizes adapter functionality, the allocation including an assignment of at least one system lane to the first primary adapter; and in response to detection of a failure of the first primary adapter after the initial system lane allocation, the multiplexer to dynamically transfer at least one assigned system lane from the failed first primary adapter to at least one adapter selected from the group consisting of: the second primary adapter and a backup adapter.

2. The system of claim 1, further comprising the multiplexer to allocate a minimal quantity of system lanes to the backup adapter during the initial system lane allocation.

3. The system of claim 1, wherein the backup adapter is absent at boot-time, and further comprising the module to dynamically detect presence of the backup adapter during run-time.

4. The system of claim 1, further comprising the module to re-assess system lane assignments to the connectors in response to the detected first primary adapter failure, and dynamically re-allocate system lanes to one or more remaining non-failed adapters, including the second primary adapter and the backup adapter.

5. The system of claim 4, wherein the dynamic system lane re-allocation comprises the multiplexer to redistribute system lanes from the failed first primary adapter to the one or more of remaining non-failed adapters, including the module to assess a quantity of system lanes available for allocation and change a quantity of system lanes assigned to one or more of the remaining non-failed adapters.

6. The system of claim 1, wherein each system lane is a transmission pathway.

7. The system of claim 6, wherein the transmission pathway is between the processor and the multiplexer.

8. A method comprising:

configuring a computer system with a plurality of connectors in communication with a module, the module comprising a multiplexer in communication with a processor and two or more host bridges in communication with the multiplexer, the host bridges including a first host bridge and a second host bridge, wherein the first host bridge is in communication with a first connector and the second host bridge is in communication with a second connector, wherein each host bridge is positioned as an interface between its respective connector and the multiplexer, and wherein each connector is configured to receive a respective adapter, including the first connector in receipt of a first primary adapter and the second connector in receipt of a second primary adapter;

the module detecting a presence of one or more adapters present at boot-time, including the first primary adapter and the second primary adapter;

an operating system of the computer system classifying the detected adapters including designating one of the detected primary adapters as the backup adapter, wherein the designation excludes the backup adapter from an initial lane allocation;

the multiplexer dynamically controlling the initial system lane allocation among the one or more detected adapters, wherein the initial system lane allocation maximizes adapter functionality, the allocation including the multiplexer to assign at least one system lane to the first primary adapter; and in response to detection of a failure of the first primary adapter after the initial system lane allocation, the multiplexer dynamically transferring at least one assigned system lane from the failed first primary adapter to at least one adapter selected from the group consisting of: the second primary adapter and a backup adapter.

9. The method of claim 8, further comprising the multiplexer allocating a minimal quantity of system lanes to the backup adapter during the initial system lane allocation.

10. The method of claim 8, wherein the backup adapter is absent at boot-time, and further comprising the module dynamically detecting presence of the backup adapter during run-time.

11. The method of claim 8, further comprising the module re-assessing system lane assignments to the connectors in response to detecting the primary adapter failure, and dynamically re-allocating system lanes to one or more remaining non-failed adapters, including any remaining primary adapters and the backup adapter.

12. The method of claim 11, wherein the dynamic system lane re-allocation comprises the multiplexer redistributing system lanes from the failed first primary adapter to the one or more of remaining non-failed adapters, including the module assessing a quantity of system lanes available for allocation and changing a quantity of system lanes assigned to one or more of the remaining non-failed adapters.

13. A computer program product comprising a computer readable hardware storage medium having program code embodied therewith, the program code executable by a processing unit to:

configure a computer system with a plurality of connectors in communication with a module, the module comprising a multiplexer in communication with a processor and two or more host bridges in communication with the multiplexer, the host bridges including a first host bridge and a second host bridge, wherein the first host bridge is communication with a first connector and the second host bridge is in communication with a second connector, wherein each host bridge is positioned as an interface between its respective connector and the multiplexer, and wherein each connector is configured to receive a respective adapter, including the first connector in receipt of a first primary adapter and the second connector in receipt of a second primary adapter;

detect, by the module, a presence of one or more adapters present at boot-time, including the first primary adapter and the second primary adapter;

classify the detected adapters including designate one of the detected primary adapters as the backup adapter, wherein the designation excludes the backup adapter from an initial lane allocation;

dynamically control, by the multiplexer, the initial system lane allocation among the one or more detected adapters, wherein the initial system lane allocation maximizes adapter functionality, the allocation including an assignment of at least one system lane to the first primary adapter; and in response to detection of a failure of the first primary adapter after the initial system lane allocation, dynamically transfer, by the multiplexer, at least one assigned system lane from the first failed primary adapter to at least one adapter selected from the group consisting of: the second primary adapter and a backup adapter.

14. The computer program product of claim 13, further comprising program code to allocate a minimal quantity of system lanes to the backup adapter during the initial system lane allocation.

15. The computer program product of claim 13, wherein the backup adapter is absent at boot-time, and further comprising program code to dynamically detect presence of the backup adapter during run-time.

16. The computer program product of claim 13, further comprising program code to re-assess system lane assignments to the connectors in response to the detection of the primary adapter failure, and dynamically re-allocate system lanes to one or more remaining non-failed adapters, including the second primary adapter and the backup adapter.

17. The computer program product of claim 16, wherein the dynamic system lane re-allocation comprises program code to redistribute system lanes from the failed first primary adapter to the one or more of remaining non-failed adapters, including program code to assess a quantity of system lanes available for allocation and change a quantity of system lanes assigned to one or more of the remaining non-failed adapters.

* * * * *